United States Patent

Messerly

[15] 3,691,117

[45] Sept. 12, 1972

[54] POLYURETHANE COMPOSITIONS OF MATTER AND METHODS OF MANUFACTURE

[72] Inventor: Alfred E. Messerly, 7955 Haskell Ave., Unit 15, Van Nuys, Calif. 91406

[22] Filed: Aug. 10, 1970

[21] Appl. No.: 62,669

Related U.S. Application Data

[63] Continuation-in-part of Ser. No. 635,659, May 3, 1967, abandoned.

[52] U.S. Cl............260/18 TN, 117/123 D, 117/148, 117/161 KP, 252/182, 260/45.7 P, 260/45.9, 260/77.5 AP

[51] Int. Cl.......C08g 22/08, C08g 22/40, C09d 3/72

[58] Field of Search.260/77.5 SS, 77.5 AP, 77.5 AX, 260/45.95, 18 TN

[56] References Cited

UNITED STATES PATENTS

| | | | |
|---|---|---|---|
| 2,915,496 | 12/1959 | Smart et al. | 260/45.7 |
| 2,929,800 | 3/1960 | Hill | 260/77.5 |
| 2,984,645 | 5/1961 | Hoeschele | 260/45.8 |
| 3,027,399 | 3/1962 | Merten | 260/471 |
| 3,028,433 | 4/1962 | Leis et al. | 260/615 |
| 3,557,032 | 1/1971 | Zemlin | 260/18 |

*Primary Examiner*—Donald E. Czaja
*Assistant Examiner*—H. S. Cockeram
*Attorney*—Mahoney, Hornbaker & Schick

[57] ABSTRACT

Improved polyurethane compositions of matter are prepared by reacting a prepolymer and a polyol in the presence of suitable catalysts to produce materials which cure rapidly and through chemical bonding, are adapted to provide covering protection for surfaces made of various substances and prevent electrolysis of conductive substances. The steps in the preparation of these improved polyurethane compositions generally provide for the reaction of higher molecular weight diols with isocyanates at an elevated temperature to insure completion of reaction and then reducing the temperature to inhibit premature formation of cross linkages in the preparation of prepolymers. The polyols used in the reaction with such prepolymers are novel in that such polyols contain chain extenders, polyfunctional polyalkylene polyols, tertiary alkanolamines, and relatively high molecular weight polyalkylene ethers.

7 Claims, No Drawings

POLYURETHANE COMPOSITIONS OF MATTER AND METHODS OF MANUFACTURE

This application is a continuation-in-part of my copending application Ser. No. 635,659, filed May 3, 1967 now abandoned.

The invention provides for a novel prepolymer prepared by a new method to insure prepolymers which can be easily reproduced without guesswork within a very narrow range and which eliminate unnecessary blending. Also, the invention provides for novel polyols for reaction with such prepolymers to provide polyurethane coatings having the ability to harden rapidly for immediate use thereafter, to have a chemical bond with the surface being covered rather than a mechanical bond with known polyurethanes, and to prevent electrolysis where the polyurethane compositions are applied on conductive substances.

The prepolymer is prepared in general by adding a suitable diisocyanate to a polyol such as a polyoxyalkylene glycol until the isocyanate concentration approximates 5 percent of the theoretical conversion, at which time the reaction is discontinued by lowering the temperature, preferably rapidly. At this point, initially, an adduct is formed of NCO endgroups without any excess isocyanate being present, thereby providing for a uniform isocyanate terminated product.

After the formation of the initial adduct, an excess of diisocyanate is added at such a temperature, for example, room temperature, that no appreciable reaction takes place between the NCO-terminated prepolymer and the reactive diisocyanate which is added thereto.

By using the above method of preparation of the prepolymer, my invention provides for reproducible compositions of prepolymers within a very narrow range of the desired amine number and NCO content, and thus, unnecessary blending is eliminated in the preparation of the polyurethane desired.

My invention employs polyols for reaction with such prepolymers in a highly characteristic manner in that these polyols are prepared from suitable chain extenders, polyfunctional polyalkylene polyols, tertiary alkanolamines, and relatively high molecular weight polyoxyalkylene ethers. In general, the prepolymer/polyol ratio is 1:1 or 2:1, which latter ratio provides for an extremely fast reaction and setting up or "curing" of the resulting polyurethane.

Thus, an object of this invention is to provide new and useful polyurethane compositions which are dimensionally stable, resistant to alkalies and acids, biologically inert, nonporous, provide chemical bonding, and prevent electrolysis.

Another object of this invention is to provide new and useful polyurethane compositions which provide monolithic area coverage.

A further object of this invention is to provide polyurethane compositions which possess greatly increased tensile strength, higher modulus, greater elongation as well as low compression set and, greater tear strength as well as increased impact resistance, over the capabilities of known polyurethane compositions.

These and other objects will be more readily understood by reference to the following specification of preferred embodiments and to the appended claims.

A typical example of the preparation of a suitable prepolymer for my novel polyurethane compositions is the following:

EXAMPLE 1

2,100 grams of a polypropylene glycol with a molecular weight of about 1,200 is introduced into a reactor vessel of about 5,000 ml. capacity together with 10.5 grams of an oxidation inhibitor, 2,6, ditertiary butyl-4-methyl phenol. The mixture is kept under agitation and under a vacuum of about 10 mm. of mercury while being heated to about 130° to about 140° C. for about 2 hours to remove moisture therefrom.

Thereafter, the temperature is reduced to about 80° C. at which point, 610 grams of tolyl diisocyanate is added.

The resulting mixture is heated to about 100° to about 150° C. with constant stirring under nitrogen gas until the isocyanate concentration approaches about 5.4 percent. The reaction is stopped at about 95 percent conversion with an NCO content of about 6 percent by cooling to room temperature under a vacuum of about 10 mm. of mercury and under nitrogen gas and by simultaneously adding 1,080 grams of tolyl diisocyanate in excess. The simultaneous cooling and dilution by adding this excess of the tolyl diisocyanate immediately stops the reaction.

The assay of the resulting prepolymer is about 17.85 percent NCO and has an amine number of 234.

The above specific example has been given as typical. However, various other polyols may be used to prepare the prepolymer, such as polyoxyalkylene glycols ranging from the molecular weight of 150 up to 6,000. Where lower molecular weight polyols are used, the temperature of the diisocyanate reaction with the polyol should be substantially reduced to prevent side reactions such as the formation of allophanates. Thus, where a polyol having a molecular weight of 500 is used, the reaction temperature should be about 60°-70° C. Where a higher molecular weight polyol is used, such as a molecular weight of 3,000, a higher reaction temperature may be used, such as about 120° to 130° C.

Other anti-oxidants may be used. For example, benzoyl chloride may be used as a controlling agent to reduce the rate of reaction to a controllable condition.

A combination of triphenylphosphite and the butyl methyl phenol described above may be used as an anti-oxidant and as a controlling agent.

The above method of preparation of prepolymers provides adducts with uniformly terminated isocyanate groups, to which free excess isocyanate can be added to produce prepolymers capable of easy reproduction within narrow ranges of desired amine numbers, thereby eliminating unnecessary blending of plurality of batches.

Further, premature formation of allophanate and urethane cross linkages is substantially prevented.

In general, a first addition of two equivalent weight of tolylidiisocyanate is used for one equivalent weight of polyol and reacted as already described; and thereafter a sufficient excess of tolyldiisocyanate is added as a second addition to give a NCO/OH ratio of between about 0.9 and about 1.25 after the polyol blend is admixed therewith, as has already been described, and as will be illustrated hereinbelow. This final NCO/OH ratio represents the ratio of the added excess, i.e., unreacted isocyanate equivalents, to hydroxyl equivalents based on the starting polyol which was reacted with the original isocyanate.

Again illustrating the invention with a specific example, I now show how a suitable polyol may be produced for use in my polyurethane composition. The polyol is prepared as follows:

EXAMPLE 2

The following mixture is introduced into a reactor vessel of about 5,000 ml. capacity under nitrogen gas and under a vacuum of about 10 mm. of mercury:

| Ingredient | Weight in Grams |
| --- | --- |
| Dipropylene glycol | 900 |
| Trifunctional polyalkylene polyol with molecular weight of about 260 (for example, "Voranol # 260") | 610 |
| Tri-isopropanolamine | 480 |
| Polypropylene glycol with molecular weight of 1200 (e.g., "Actol 23-95") | 1510 |
| 2,6-di-tertiary butyl-4-methyl phenol | 17.5 |

The above mixture is heated at about 130° C. under a vacuum of 10 mm., for about 2 hours, or until the moisture content is less than 0.03 percent as determined by the Karl Fischer method.

The resulting polyol has a hydroxyl number of about 484 or a OH percent of about 14.7 percent with an equivalent weight of 116.

After the reaction product has reached the proper moisture content level, it is cooled to room temperature under continued vacuum and stored in moisture-proof containers. The resulting polyol will have a hydroxyl number of about 116 or 117.

The polyurethane composition itself may be prepared as indicated in the following Example 3:

EXAMPLE 3

The prepolymer and the polyol as described above are mixed in a ratio of 2 to 1 parts respectively, in a suitable reaction vessel, for 3 to 5 minutes at room temperature under a vacuum of 10 mm. of mercury and under nitrogen gas. Then, 0.2 to 0.3 percent of the amount of polyol present is computed, and that amount of lead octoate solution is added to the mixture of prepolymer and polyol, the resulting mixture is stirred rapidly until a perceptible increase in viscosity takes place, and the reaction product is then ready to be sprayed as desired or poured into a mold.

The resulting polyurethane composition will set up very hard in a few minutes, independent of the ambient temperature.

In place of lead octoate, any other common organic lead salt may be used, such as lead laurate, lead naphthenate, and the like, in the amount of about 0.2 to 0.3 percent by weight of polyol.

It has been found that when bringing together the prepolymer and the polyol in accordance with the invention, the reaction rate upon adding a suitable catalyst is extremely fast.

For large scale preparation, the catalyst should be added to the mixture of the prepolymer and the polyol a split second before clearing the spray nozzle. This addition can be easily done with an accurate metering pump to insure a complete mixing of the catalyst with the prepolymer and polyol.

If desired, the catalyst may be added to the polyol upon its preparation. Nevertheless, I have found it preferable to add the catalyst only after the prepolymer and polyol have been first mixed, because of the extremely rapid reaction under the conditions of my methods of preparation.

I have found that polyols prepared by the method of Example 2, when reacted with a prepolymer such as that of Example 1, will produce polyurethane compositions which fulfill the objects of my invention as stated previously.

Such polyols are preferably prepared from 3 moles of a chain extender, 1 mole of a polyfunctional polyalkylene polyol with a functionality of 3 or higher, 1 mole of a tertiary alkanolamine, 1 mole of a relatively high molecular weight polyoxyalkylene ether with a functionality of 2, and an amount of anti-oxidant sufficient to prevent oxidation during the reaction.

In general, a suitable chain extender for such polyols may be selected from a variety of compounds having a functionality of 2 provided that the molecular weight does not exceed 500. Thus, chain extenders may be selected from polyoxyalkylene glycols having a molecular weight ranging up to 500, including compounds from the methylene series, ethylene series, propylene or trimethylene or isopropylene series, tetramethylene or butylene series, pentamethylene or amylene series, and hexylene series.

Since the polyfunctional polyalkylene polyol serves as a cross linking group member, it may be selected from polyalkylene polyols having a functionality of 3 or higher and a molecular weight ranging from 92 to 6,000. I define functionality as the number of reactive sites per molecule. Triols such as polyfunctional polyalkylene ethers having a similar range of molecular weights may also be employed as a cross linking group member.

Since the amine compound used in the preparation of my novel polyols acts as a catalyst as well as being incorporated in the polyol itself, various polyalkanol amines with a functionality of 2 or higher may be used instead of a tertiary alkanolamine. Amines such as poly methylol, poly ethylol, and poly butylol derivates of ammonia may also be used.

The relatively high molecular weight polyoxyalkylene ether may range over a molecular weight of 500 to 6,000, provided that it has a functionality of at least 2 or higher.

Any suitable anti-oxidant may be used in the preparation of such polyols.

The polyurethane compositions produced by the reaction of prepolymers and polyols of my invention may readily be used as coatings for all types of materials, particularly for concrete floors, Portland cement, stucco walls, and tile and wood surfaces.

My polyurethane compositions enter into a chemical bond with such materials; thus, hydrogen bonding occurs between such polyurethane compositions and materials such as stucco, concrete and asphalt tile surfaces. In addition, my polyurethane compositions can be spotted since they have the capacity of bonding to themselves.

When used as a floor covering in a thickness ranging from 10 to 60 thousandths of an inch, my polyurethane compositions reduce wear on the floor, will not peel off due to hydrogen bonding between the urethane composition and the floor material, will not lose its luster or sheen, can be spotted since it bonds to itself, is impact resistant, and is resilient. It also resists spike heels of women's shoes.

My polyurethane compositions, when applied as coatings, also prevent electrolysis of conductive pipe, steel towers, water pipes on ships, and provide complete insulation to wires of all kinds.

Since my polyurethane compositions avoid the use of solvent in their preparation, they may be applied directly to the desired surface and may be ready for immediate use since they set up in a matter of minutes into a hard, tough, durable coating. No waiting time is necessary for solvent to evaporate or dry. Because of their density and strength, my polyurethane compositions may be steam-cleaned and may be maintained without the use of wax or polish of any kind.

When these polyurethane compositions are used as floor coverings, the floor may be flooded with water without affecting the coating. Furthermore, these polyurethane compositions are impervious to bacteria of all kinds and will not favor bacterial growth.

Although I have described my invention in detail with reference to preferred embodiments of products and methods of producing them, it is understood that numerous changes in the reagents and in the steps of the described procedures may be made without departing from the spirit and scope of the invention as claimed.

I claim:

1. A method of preparation of a polyurethane composition, comprising the steps of:
    preparing a prepolymer by adding an oxidation-inhibiting amount of an oxidation inhibitor to a quantity of a polyoxyalkylene glycol having a molecular weight ranging from 150 up to 6,000; removing any moisture in the resulting mixture, adding about 2 equivalents of an aromatic diisocyanate for each equivalent of polyoxyalkylene glycol; heating the resulting mixture with stirring under a vacuum until the isocyanate concentration approximates 5 percent of the theoretical conversion; and stopping the reaction by cooling the reaction mixture to room temperature and simultaneously adding an excess of about 6 moles of said isocyanate;
    adding from 1 to 2 parts of said prepolymer to 1 part of a polyol prepared by heating a mixture under a vacuum, until the mixture has a moisture content of less than 0.03 percent, said mixture containing 3 moles of a polyalkylene glycol having a molecular weight ranging up to 500, 1 mole of polyalkylene polyol having a functionality of at least 3 and a molecular weight ranging from 90 to 6,000, 1 mole of a polyalkanol amine having a functionality of at least 2, 1 mole of a polyoxyalkylene ether having a functionality of 2 and a molecular weight ranging from 500 to 6,000, and an antioxidant;
    adding an amount of an organic salt of lead computed on the basis of 0.2 to 0.3 percent of the amount of said first mentioned polyol; and
    stirring the resulting polyurethane composition rapidly until a preceptible increase in viscosity occurs.

2. The method in accordance with claim 1 wherein said organic salt of lead is lead octoate.

3. The method in accordance with 3 1 including the additionalc step of applying said composition to a surface prior to solidification, so that solidification occurs with said mixture in bonding contact with a surface.

4. The method in accordance with claim 3, wherein said surface is chosen from the class consisting of surfaces of concrete, Portland cement, stucco, tile, wood, and steel.

5. The method in accordance with claim 4 wherein said organic salt of lead is chosen from the class consisting of lead octoate, lead laurate and lead naphthenate and wherein said anti-oxidant is 2,6, ditertiary butyl-4-methyl phenol.

6. A polyurethane composition prepared by mixing (I) a prepolymer, prepared by reacting, at about 70°–130°C., two equivalents of an aromatic isocyanate with one equivalent of a moisture-free polyoxyalkylene glycol which contains an oxidation-inhibiting amount of an oxidation inhibitor, said glycol having a molecular weight between 150 and 600, stopping the reaction when it reaches approximately 95 percent completion by simultaneously lowering the temperature and adding excess aromatic isocyanate, with (II) a polyol blend in a ratio of 2 parts by weight of prepolymer to 1 part of polyol blend, said excess aromatic isocyanate being added in an amount to give a ratio of NCO to OH of between about 0.9 to 1.25 after admixture of said prepolymer with said polyol blend, said polyol blend being prepared by heating under vacuum at about 130° C. until the moisture content is below 0.03 percent, a mixture of 3 moles of a polyalkylene glycol having a molecular weight up to 500, 1 mole of polyalkylene polyol having a functionality of at least 3 and a molecular weight ranging up to 6,000, 1 mole of a polyalkanol amine having a functionality of at least 2, 1 mole of a polyoxyalkylene ether having a functionality of 2 and a molecular weight ranging from 500 to 6,000, and an oxidation-inhibiting amount of an oxidation inhibitor; continuing said mixing for about 3 to 5 minutes at room temperature under vacuum, then adding to the mixture of 0.2 to 0.3 percent, based on the polyol blend, of an organic salt of lead capable of catalyzing reaction of the prepolymer and polyol blend to polyurethane and rapidly stirring the mixture until a perceptible increase in viscosity takes place, pouring the resulting composition into a mold or applying it to a surface and allowing it to harden.

7. Method in accordance with claim 4 in which the surface is asphalt tile.

* * * * *